US011256526B2

(12) United States Patent
VanBlon et al.

(10) Patent No.: US 11,256,526 B2
(45) Date of Patent: Feb. 22, 2022

(54) CONTEXTUAL ITEM MANAGEMENT

(71) Applicant: Lenovo (Singapore) Pte. Ltd., Singapore (SG)

(72) Inventors: Russell VanBlon, Raleigh, NC (US); Robert Kapinos, Durham, NC (US); Scott Wentao Li, Cary, NC (US); Timothy Winthrop Kingsbury, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/600,108

(22) Filed: Oct. 11, 2019

(65) Prior Publication Data

US 2021/0109768 A1 Apr. 15, 2021

(51) Int. Cl.
*G06F 9/451* (2018.01)
*G06F 11/34* (2006.01)
*H04L 67/50* (2022.01)
*G06F 11/32* (2006.01)
*G06F 11/30* (2006.01)

(52) U.S. Cl.
CPC ............ *G06F 9/451* (2018.02); *G06F 11/302* (2013.01); *G06F 11/327* (2013.01); *G06F 11/3438* (2013.01); *H04L 67/22* (2013.01)

(58) Field of Classification Search
None
See application file for complete search history.

(56) References Cited

U.S. PATENT DOCUMENTS

| 7,003,513 | B2* | 2/2006 | Geiselhart | G06F 16/3326 |
| 2009/0089133 | A1* | 4/2009 | Johnson | G06Q 10/109 |
| | | | | 705/7.21 |
| 2010/0138416 | A1* | 6/2010 | Bellotti | G06F 16/436 |
| | | | | 707/736 |
| 2010/0222027 | A1* | 9/2010 | Scott | G06Q 30/02 |
| | | | | 455/412.2 |
| 2013/0238393 | A1* | 9/2013 | Raichelgauz | H04N 21/25891 |
| | | | | 705/7.29 |
| 2013/0311167 | A1* | 11/2013 | Borg | G06Q 10/109 |
| | | | | 704/9 |
| 2013/0332170 | A1* | 12/2013 | Melamed | G10L 13/027 |
| | | | | 704/260 |
| 2014/0074536 | A1* | 3/2014 | Meushar | G06Q 10/1095 |
| | | | | 705/7.19 |
| 2015/0135085 | A1* | 5/2015 | Shoham | G06Q 10/109 |
| | | | | 715/739 |
| 2016/0188596 | A1* | 6/2016 | Keggi | G06Q 30/0631 |
| | | | | 703/11 |
| 2016/0315885 | A1* | 10/2016 | Sanghavi | H04L 51/046 |
| 2017/0140041 | A1* | 5/2017 | Dotan-Cohen | G06Q 10/101 |
| 2017/0351674 | A1* | 12/2017 | Kumar | G06F 9/54 |

(Continued)

*Primary Examiner* — Ryan F Pitaro
(74) *Attorney, Agent, or Firm* — Schwegman Lundberg & Woessner, P.A.

(57) ABSTRACT

A computer implemented method includes receiving an indication of a first item to be saved for later interaction, monitoring a context of a user's activity, comparing the context of the user's activity to a list of saved items, including the first item, selecting the first item in response to a determination that the context of the user's activity is suitable for interacting with the first item, and modifying a user interface to alert the user regarding the first item.

20 Claims, 3 Drawing Sheets

(56) References Cited

U.S. PATENT DOCUMENTS

| | | | | |
|---|---|---|---|---|
| 2018/0032997 | A1* | 2/2018 | Gordon | G06Q 30/0269 |
| 2018/0152403 | A1* | 5/2018 | Charignon | H04L 67/22 |
| 2019/0102139 | A1* | 4/2019 | Liusaari | H04N 21/458 |
| 2019/0334907 | A1* | 10/2019 | Rodden | G06Q 10/063116 |
| 2020/0004816 | A1* | 1/2020 | Kieser | G06F 40/35 |
| 2020/0041803 | A1* | 2/2020 | Reyes | G06F 3/016 |
| 2020/0186382 | A1* | 6/2020 | Harel | H04L 51/063 |
| 2021/0119955 | A1* | 4/2021 | Penov | G06Q 10/1095 |
| 2021/0144446 | A1* | 5/2021 | Wang | H04N 21/4661 |

* cited by examiner

CONTEXTUAL ITEM MANAGEMENT

BACKGROUND

Our busy lives provide occasional opportunities to read content or perform tasks that were saved for later, but it's up to the user to remember to read content or perform tasks from various lists. However, people often forget things and opportunities are missed. While a task list may send pre-planned reminders, and a calendar may provide reminders of upcoming events, such reminders are scheduled, either automatically, or by the user and may or may not coincide with a convenient time to perform such as tasks or read such content. Otherwise, the user must remember to pull up content or a task that was previously saved for later when an opportunity presents itself.

SUMMARY

A computer implemented method includes receiving an indication of a first item to be saved for later interaction, monitoring a context of a user's activity, comparing the context of the user's activity to a list of saved items, including the first item, selecting the first item in response to a determination that the context of the user's activity is suitable for interacting with the first item, and modifying a user interface to alert the user regarding the first item.

DETAILED DESCRIPTION

Figure 1:
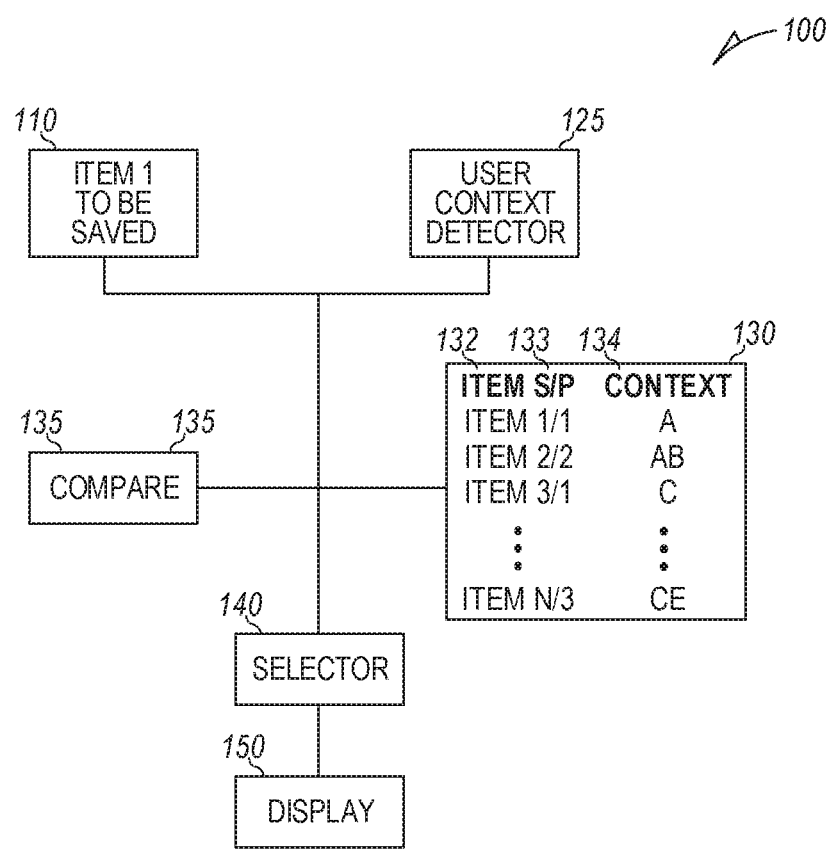
FIG. 1 is a block diagram of a system for implementing a digital assistant to suggest items for a user to interact with according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term. "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Users may save tasks or content, referred to as items for interaction with at an unspecified later time. In various embodiments, previously identified or saved items are delivered or otherwise brought to the attention of the user by a digital assistant based on the user's detected context. The items may include many different types of tasks or content, such as a browsing page that was 'saved for later', a to-do, a task marked to be completed by a specific day, a book to be read, a podcast to be listened to, or many other items.

The digital assistant helps the user interact with items at opportune times, contexts, or times and contexts rather than just delivering them at certain times. For example, say the user saves an article they wish to read later. Rather than waiting for the user to decide the timing is right to read the article, the digital assistant delivers a notification to the user's device in response to detecting that the user is in an "idle" context. The item delivery may be deferred until the saved item, such as a task, has aged to a certain point, e.g. "Notify me only for content saved 3+ days ago". The user's device(s) in one embodiment detects a suitable context after that point in time.

Task delivery could occur before or after a task is scheduled for notification. Rather than notifying at a specific time, the task could be delivered a few hours earlier, a few hours later, or even days earlier if a good opportunity arises for executing that task. In addition to saved content, this could also apply to future tasks. For example, if a user has an upcoming task on their calendar to research something, the user could be notified earlier to do that task if a current context is a good fit for doing that task.

A context may be detected via many different mechanisms, such as one or more of calendar events that identify a context, such as being in a car, bus, or train to travel to a meeting, sporting events, lack of input by hand to one or more devices, GPS signals indicating speed indicative of walking or riding in a vehicle, accelerometers indicative of inactivity, a combination of a calendar entry indicating a flight, a GPS sensed location corresponding to an airport before the flight, an accelerometer indication of lack of movement, and lack of other interaction with a user device. Many other means of identifying context may be used. The user may specify the types of contexts which correspond to individual saved activities or related general activities in various embodiments.

Detection of a user's context is known today. Detection capabilities will grow as Internet of things (IoT) devices learn more about the user's context. The user in one embodiment may pre-program instances that present "good contexts" for their device to notify them. Examples include, but are not limited to: While eating, notify me of content that I can read, listen to, or watch. This could be an article, video, email, etc. While driving, notify me of content that I can listen to. This could be articles that can be read to me. While playing games on my device, notify me of an upcoming task that requires me to research something. While at a certain location (e.g. standing in a long line at the post office), provide a piece of content that I "saved for later" to read—When I sit down on the couch, show me a list of YouTube videos that I haven't watched yet. The videos could be videos I saved, or new videos that match my preferences.

Today the delivery of items is ill-timed. When the user is alone with no handheld smart devices nearby, content may be delivered via a standalone digital assistant. These are just examples, and there are several ways to determine the user's context. The goal is to take that context, identify when the user is "mentally under capacity" and help them execute their tasks, consume content, and interact with other items when the time is right. In addition, the digital assistant may prioritize items and bring higher priority items to the attention of the user that were from specific senders or prioritize those items associated with certain more urgent topics in times of 'less idleness'. The user may configure which topics should be prioritized higher or lower.

FIG. 1 is a block diagram of a system 100 for implementing a digital assistant to suggest items for a user to interact with. A user item to be saved, designated item 1, is shown at 110. A user context detector 125 detects a current context of a user. An item and associated context data structure is shown at 130, and may be stored by system 100 for use in associating contexts with corresponding items that are saved for a user to interact with at a later point in time. The data structure 130 in one embodiment includes a list of items 132, a priority 133 for each item, and a context as shown at 134.

Item 1 is shown saved in the data structure 130 along with items 1, 2, 3 . . . N. Item 1 is shown as having a priority of 1, which in one embodiments may be a highest priority, and with a context of A. There are several different contexts that may be associated with an item, and in some embodiments more than one context may be associated with an item, such as shown at item 2 with a priority of 2, and a context of A and B. Thus, whenever context A or context B is detected, item 2 may be selected, and it context A is detected, items 1 and 2 may be selected, with item 1 being of high priority, and selected first. Item 3 also has a priority of 1, and has a context of C. Item N is shown with a priority of 3 and a context of C or E. In further embodiments, contexts may be associated with a logical AND function, such that if the context associated with Item N is a logical AND function both contexts C and E must be present for item N to be selected.

A compare function 135 is shown coupled to the data structure 130, as well as user context detector 125. In response to the context detector 125 detecting a particular context, such as context A, the compare function 135 scans the data structure for items having a context of A and finds that items 1 and 2 have such a context. A selector function 140 receives an indication that items 1 and 2 have been found and selects item 1 for alerting the user via display 150. Note that display 150 is representative of a display device or a speaker for audibly informing a user of the results of the compare and selector functions, or a combination of both a display device and speaker or other means of providing alerts. The selector function 140 may utilize the priority 133 to sort the times identified by the compare function. Note that in one embodiment, the presence of two contexts associated with an item may be used to raise the priority level and replace a higher priority item's position on the list. Such a raise in priority may be helpful as the presence of more than one context associated with an item may make it even more convenient for the user to interact with such an item.

Figure 2:
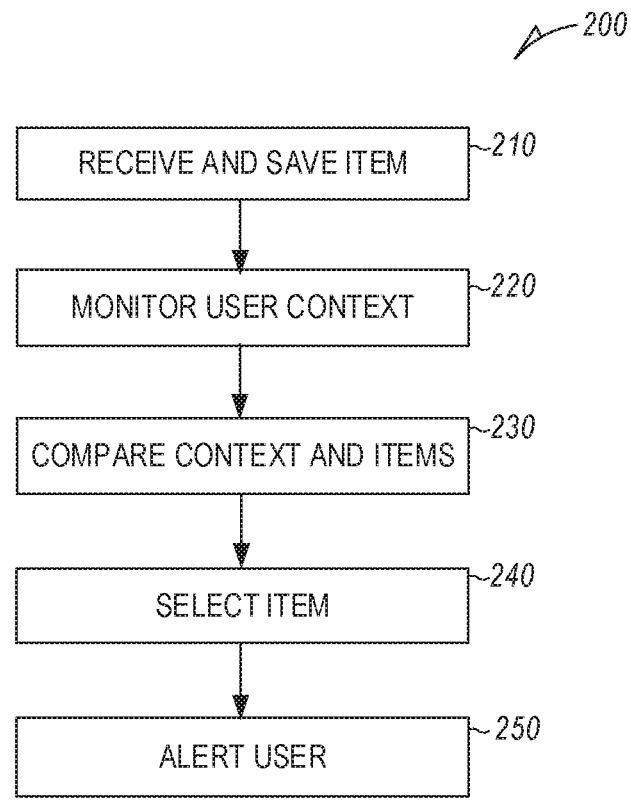
FIG. 2 is a flowchart illustrating a computer implemented method of alerting a user to items to be interacted with based on a context of the user according to an example embodiment.

FIG. 2 is a flowchart illustrating a computer implemented method 200 of alerting a user to items to be interacted with based on a context of the user. Method 200 may be performed by a digital assistant comprising one or more elements of FIG. 1, such as the compare functions 135 and selector 140. Input may be received from user context detector 125 and an interface corresponding to item 1 110 with access to data structure 130.

Method 200 begins by receiving an indication of a first item to be saved for later interaction at operation 210. Operation 220 monitors a context of a user's activity, such as by analyzing input from user context detector 125. The context may include one or multiple contexts. The context may be selected from at least one of calendar events, lack of input by hand, sensed inactivity, sensed driving, standing in a line waiting, and playing games on a user device.

The context of the user's activity is compared at operation 230 to a list of saved items, including the first item. Operation 230 may optionally delay comparing an item until a specified aging time is reached. A operation 240, the first item is selected in response to a determination that the context of the user's activity is suitable for interacting with the first item. At operation 250, a user interface is modified to alert the user regarding the first item. The user interface to alert the user regarding the first item may be modified by presenting the first reading content to the user via text on a screen of the computer or providing the first reading content audibly. In one embodiment, multiple saved items are selected in response to the detected user activity context and alerted to the user. The multiple selected items are alerted to the user in a prioritized manner in some embodiments.

Operation 220 may also be used to associate a specific user activity context that is suitable with the first item. The association may be done via a user interface at the time of saving the item for later use. The interface may include a selection of detectable contexts from which a user may select one or more of the contexts. In further embodiments, the context for a particular item may be automatically selected by comparing users' past context selections for different types of tasks. In one example, the first item comprises a first reading content and the associated specific user activity context comprises eating food.

In one embodiment, the first item is a task stored on a task management application. Comparing operation 230 may be performed prior to a task due date such that the task is presented prior to the task due date.

In one example, a specific user activity context that is suitable with the first item is associated with the first. For example, the first item may include video content and the associated specific user activity context includes one or more of riding in a vehicle, waiting for a plane, or eating food.

Figure 3:
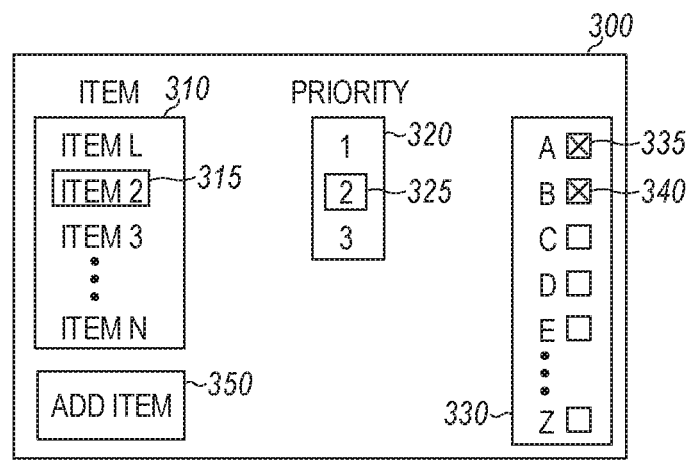
FIG. 3 is a block representation of a user interface illustrating the ability of a user to select items and assign priorities and a context according to an example embodiment.

FIG. 3 is a block representation of a user interface 300 illustrating the ability of a user to select items and assign priorities and a context. A list of items 310 is shown with item 2 at 315 indicated as selected by the user. A list of priorities 320 is shown with priority 2 at 325 indicated as selected by the user. The lists may be drop down menus in some embodiments. A context list 330 is shown with multiple contexts indicated by letters A, B, C, D, E . . . Z. The letters may be replaced with descriptive text in some embodiments to help a user understand the contexts. Checkboxes are provided in one embodiment and are associated with the contexts. In the example shown in FIG. 3, checkboxes 335 and 340 are shown as selected, corresponding to contexts A and B. This selection is also reflected in data structure 130 in FIG. 1. Note that the method of selecting values and items may be modified. Check boxes, highlighting, underlining, or other method may be used to visualize the selection of an item, priority, or context.

In one embodiment, and item may be added via add item button 350. Button 350 may allow entry of text describing the item as well as information suitable for selecting the item to interact with. Items may also be dragged to the add item button 350 in further embodiments to add and item to the list 310, allowing the assignment of priority and context(s) to added item.

In further embodiments, users may also select one or bad contexts per item. For instance, even if one or more good contexts are present at a particular point in time, if a bad context is also detected, such as the user's hands are already interacting with one or more devices, the associated item will not be selected for alerting the user. One example might be while at a child's baseball game and using the device to take pictures or while writing an email, the hands of the user are in use, and it is not a good time to present a video or book item to the user, even though the user is not moving around and is out of the office. The game itself, either based on location or a calendar entry being detected, may also be identified as a bad context. Other locations can similarly be defined as bad contexts, such as being at work with the item being a personal item.

Similarly, while in a car and carrying on a conversation with another passenger may be identified as a bad context. The digital assistant may detect that a conversation is being held, which may be identified as a bad context for reading a book out loud.

Figure 4:
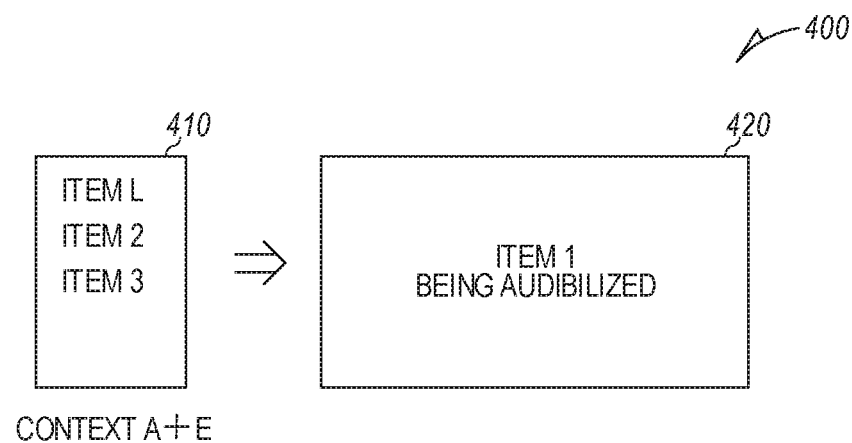
FIG. 4 is an illustration of a user interface for presenting selected items to a user for interaction according to an example embodiment.

FIG. 4 is an illustration of a user interface 400 for presenting selected items to a user for interaction. The context for a list 410 of items that were selected for alerting the user included contexts A and E corresponding to data structure 130 in FIG. 1. The list 410 includes item 1, item 2, and item N. Note that item 1 appears first in the list as the priority for item 1 is the highest, at 1. Item 2 appears second with a priority of 2, and item N appeared last, with a priority of 3. Items 1 and 1 have a context of A, and item N has a context of E, resulting in their appearance in list 410. Block 420 illustrates a user interacting with item 1, corresponding to the user selecting item 1 from the list 410. In further embodiments, the user may indicate that the first item in the list should be automatically selected for interaction. The interaction shown at 420 is audible playing of item 1, which may be an article, email, book, or other form of text in one embodiment. Other interactions may vary depending on user preferences and the type of item. A suitable application may be opened to provide for interaction with various items, such as word processors, spreadsheets, email programs, presentation preparation programs, video players, audio players, etc.

Figure 5:
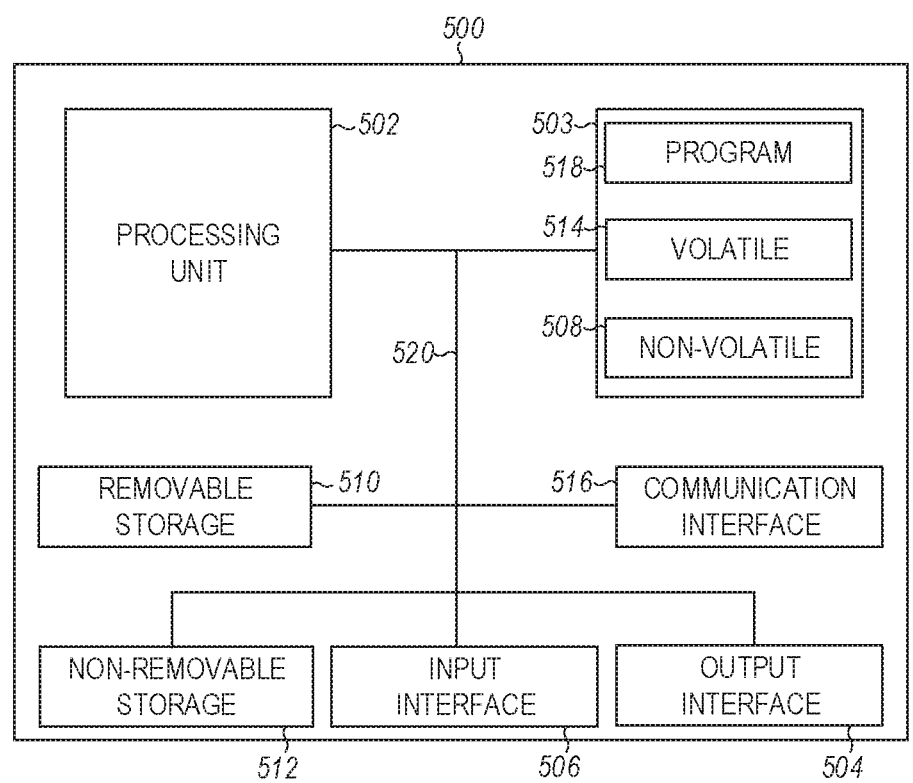
FIG. 5 is a block schematic diagram of a computer system to implement one or more example embodiments.

FIG. 5 is a block schematic diagram of a computer system 500 to implement and manage the saving and selecting of items for later interaction and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

Examples

1. A computer implemented method includes receiving an indication of a first item to be saved for later interaction, monitoring a context of a user's activity, comparing the context of the user's activity to a list of saved items, including the first item, selecting the first item in response to a determination that the context of the user's activity is suitable for interacting with the first item, and modifying a user interface to alert the user regarding the first item.

2. The method of example 1 and further including associating a specific user activity context that is suitable with the first item.

3. The method of example 2 wherein the first item includes a first reading content and wherein the associated specific user activity context comprises eating food.

4. The method of example 3 wherein modifying the user interface to alert the user regarding the first item comprises presenting the first reading content to the user via text on a screen of the computer or providing the first reading content audibly.

5. The method of any of examples 1-4 and further including delaying the comparing until a first item specified aging time is reached.

6. The method of any of examples 1-5 wherein the first item includes a task stored on a task management application, and wherein the comparing is performed prior to a task due date such that the task is presented prior to the task due date.

7. The method of any of examples 1-6 wherein the context is selected from at least one of calendar events, lack of input by hand, sensed inactivity, sensed driving, standing in a line waiting, and playing games on a user device.

8. The method of any of examples 1-7 wherein multiple saved items are selected in response to the detected user activity context and alerted to the user.

9. The method of example 8 wherein the multiple selected items are alerted to the user in a prioritized manner.

10. The method of any of examples 1-8 and further including associating a specific user activity context that is suitable with the first item and wherein the first item comprises a video content and wherein the associated specific user activity context comprises one or more of riding in a vehicle, waiting for a plane, or eating food.

11. A machine-readable storage device has instructions for execution by a processor of a machine to cause the processor to perform operations to perform a method. The operations including receiving an indication of a first item to be saved for later interaction, monitoring a context of a user's activity, comparing the context of the user's activity to a list of saved items, including the first item, selecting the first item in response to a determination that the context of the user's activity is suitable for interacting with the first item, and modifying a user interface to alert the user regarding the first item.

12. The device of example 11 and further including associating a specific user activity context that is suitable with the first item.

13. The device of example 12 wherein the first item includes a first reading content and wherein the associated specific user activity context comprises eating food.

14. The device of example 13 wherein modifying the user interface to alert the user regarding the first item includes presenting the first reading content to the user via text on a screen of the computer or providing the first reading content audibly.

15. The device of any of examples 11-14 and further including delaying the comparing until a first item specified aging time is reached.

16. The device of any of examples 11-15 wherein the first item includes a task stored on a task management application, and wherein the comparing is performed prior to a task due date such that the task is presented prior to the task due date.

17. The device of any of examples 11-16 wherein multiple saved items are selected in response to the detected user activity context and alerted to the user, wherein the multiple selected items are alerted to the user in a prioritized manner, and further including associating a specific user activity context that is suitable with the first item wherein the first item comprises a video content and wherein the associated specific user activity context comprises one or more of riding in a vehicle, waiting for a plane, or eating food.

18. A device includes a processor and a memory device coupled to the processor and having a program stored thereon for execution by the processor to perform operations including receiving an indication of a first item to be saved for later interaction, monitoring a context of a user's activity, comparing the context of the user's activity to a list of saved items, including the first item, selecting the first item in response to a determination that the context of the user's activity is suitable for interacting with the first item, and modifying a user interface to alert the user regarding the first item.

19. The device of example 18 and further including associating a specific user activity context that is suitable with the first item wherein the first item includes a first reading content and wherein the associated specific user activity context includes eating food and wherein modifying the user interface to alert the user regarding the first item comprises presenting the first reading content to the user via text on a screen of the computer or providing the first reading content audibly.

20. The device of any of examples 18-19 wherein multiple saved items are selected in response to the detected user activity context and alerted to the user, wherein the multiple selected items are alerted to the user in a prioritized manner, and further including associating a specific user activity context that is suitable with the first item wherein the first item includes a video content and wherein the associated specific user activity context includes one or more of riding in a vehicle, waiting for a plane, or eating food.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   detecting a presence of a context associated with a user's activity;
   comparing the context associated with the user's activity to a list of saved items, the list of saved items including a first item and a second item, the first item and the second item being saved in a context data structure, the context data structure associating a priority and one or more contexts with each of the first item and the second item;
   selecting the first item and the second item in response to a determination that the context of the user's activity is suitable for interacting with the first item and the second item, the determination based on a comparison of the context of the user's activity with the one or more contexts associated with each of the first item and the second item; and
   based on a detecting a presence of an additional context associated with the user's activity, modifying a user interface to alert the user regarding the first item, the modifying based on a raising of the priority associated with the first item to replace the second item at a higher position in a priority list, the determination based the additional context being defined as a bad context with respect to the second item.

2. The method of claim 1 and further comprising associating a specific user activity context that is suitable with the first item.

3. The method of claim 2 wherein the first item comprises a first reading content and wherein the associated specific user activity context comprises eating food.

4. The method of claim 3 wherein modifying the user interface to alert the user regarding the first item comprises presenting the first reading content to the user via text on a screen of the computer or providing the first reading content audibly.

5. The method of claim 1 and further comprising delaying the comparing until a first item specified aging time is reached.

6. The method of claim 1 wherein the first item comprises a task stored on a task management application, and wherein the comparing is performed prior to a task due date such that the task is presented prior to the task due date.

7. The method of claim 1 wherein the context is selected from at least one of calendar events, lack of input by hand, sensed inactivity, sensed driving, standing in a line waiting, and playing games on a user device.

8. The method of claim 1 wherein multiple saved items are selected in response to the detected user activity context and alerted to the user.

9. The method of claim 1 and further comprising associating a specific user activity context that is suitable with the first item and wherein the first item comprises a video content and wherein the associated specific user activity context comprises one or more of riding in a vehicle, waiting for a plane, or eating food.

10. The computer implemented method of claim 1, wherein the level of priority of the first item and an assignment of the first item to the first context and the second context are specified via an additional user interface.

11. A machine-readable storage device having instructions for execution by a processor of a machine to cause the processor to perform operations to perform a method, the operations comprising:
    detecting a presence of a context associated with a user's activity;
    comparing the context associated with the user's activity to a list of saved items, the list of saved items including a first item and a second item, the first item and the second item being saved in a context data structure, the context data structure associating a priority and one or more contexts with each of the first item and the second item;
    selecting the first item and the second item in response to a determination that the context of the user's activity is suitable for interacting with the first item and the second item, the determination based on a comparison of the context of the user's activity with the one or more contexts associated with each of the first item and the second item; and
    based on a detecting a presence of an additional context associated with the user's activity, modifying a user interface to alert the user regarding the first item, the modifying based on a raising of the priority associated with the first item to replace the second item at a higher position n a priority list, the determination based the additional context being defined as a bad context with respect to the second item.

12. The device of claim 11 and further comprising associating a specific user activity context that is suitable with the first item.

13. The device of claim 12 wherein the first item comprises a first reading content and wherein the associated specific user activity context comprises eating food.

14. The device of claim 13 wherein modifying the user interface to alert, the user regarding the first item comprises presenting the first reading content to the user via text on a screen of the computer or providing the first reading content audibly.

15. The device of claim 11 and further comprising delaying the comparing until a first item specified aging time is reached.

16. The device of claim 11 wherein the first item comprises a task stored on a task management application, and wherein the comparing is performed prior to a task due date such that the task is presented prior to the task due date.

17. The device of claim 11 wherein multiple saved items are selected in response to the detected user activity context and alerted to the user and further comprising associating a specific user activity context that is suitable with the first item wherein the first item comprises a video content and wherein the associated specific user activity context comprises one or more of riding in a vehicle, waiting for a plane, or eating food.

18. A device comprising:
a processor; and
a memory device coupled to the processor and having a program stored thereon for execution by the processor to perform operations comprising:
detecting a presence of a context associated with a user's activity;
comparing the context associated with the user's activity to a list of saved items, the list of saved items including a first item and a second item, the first item and the second item being saved in a context data structure, the context data structure associating a priority and one or more contexts with each of the first item and the second item;
selecting the first item and the second item in response to a determination that the context of the user's activity is suitable for interacting with the first item and the second item, the determination based on a comparison of the context of the user's activity with the one or more contexts associated with each of the first item and the second item; and
based on a detecting a presence of an additional context associated with the user's activity, modifying a user interface to alert the user regarding the first item, the modifying based on a raising of the priority associated with the first item to replace the second item at a higher position in a priority list, the determination based the additional context being defined as a bad context with respect to the second item.

19. The device of claim 18 and further comprising associating a specific user activity context that is suitable with the first item wherein the first item comprises a first reading content and wherein the associated specific user activity context comprises eating food and wherein modifying the user interface to alert the user regarding the first item comprises presenting the first reading content to the user via text on a screen of the computer or providing the first, reading content audibly.

20. The device of claim 18 wherein multiple saved items are selected in response to the detected user activity context and alerted to the user and further comprising associating a specific user activity context that is suitable with the first item wherein the first item comprises a video content and wherein the associated specific user activity context comprises one or more of riding in a vehicle, waiting for a plane, or eating food.

* * * * *